(12) United States Patent
Wagoner et al.

(10) Patent No.: US 8,773,873 B2
(45) Date of Patent: Jul. 8, 2014

(54) METHODS AND SYSTEMS FOR OPERATING A POWER CONVERTER

(75) Inventors: Robert Gregory Wagoner, Roanoke, VA (US); David Smith, Daleville, VA (US)

(73) Assignee: General Electric Company, Schenectady, NY (US)

( * ) Notice: Subject to any disclaimer, the term of this patent is extended or adjusted under 35 U.S.C. 154(b) by 111 days.

(21) Appl. No.: 13/327,077

(22) Filed: Dec. 15, 2011

(65) Prior Publication Data

US 2013/0155732 A1  Jun. 20, 2013

(51) Int. Cl.
    *H02M 1/12* (2006.01)
(52) U.S. Cl.
    USPC .............................. 363/40; 307/105; 323/207
(58) Field of Classification Search
    USPC ................ 363/39–43; 307/105; 323/205, 207
    See application file for complete search history.

(56) References Cited

U.S. PATENT DOCUMENTS

| | | | | |
|---|---|---|---|---|
| 5,329,222 | A * | 7/1994 | Gyugyi et al. ................. | 323/207 |
| 6,693,409 | B2 * | 2/2004 | Lynch et al. .................... | 323/208 |
| 7,145,266 | B2 * | 12/2006 | Lynch et al. .................... | 307/65 |
| 7,183,667 | B2 * | 2/2007 | Colby et al. .................... | 307/19 |
| 7,465,872 | B1 * | 12/2008 | de Rooij et al. ................ | 136/243 |
| 7,847,526 | B2 * | 12/2010 | Tan et al. ......................... | 322/46 |
| 2009/0134714 | A1 * | 5/2009 | Tarkiainen et al. ............ | 307/105 |
| 2010/0157638 | A1 * | 6/2010 | Naiknaware et al. .......... | 363/131 |
| 2011/0096579 | A1 | 4/2011 | Klodowski et al. | |
| 2011/0130889 | A1 * | 6/2011 | Khajehoddin et al. ......... | 700/298 |
| 2011/0245990 | A1 * | 10/2011 | Rasmussen .................... | 700/298 |
| 2011/0255307 | A1 | 10/2011 | Kim | |
| 2012/0087159 | A1 * | 4/2012 | Chapman et al. ................ | 363/41 |
| 2013/0051091 | A1 * | 2/2013 | Datta et al. ....................... | 363/35 |

FOREIGN PATENT DOCUMENTS

| | | |
|---|---|---|
| EP | 2362515 A1 | 8/2011 |
| WO | 2011032287 A1 | 3/2011 |

OTHER PUBLICATIONS

Search Report and Written Opinion from corresponding PCT Application No. PCT/US2012/069652, dated Jun. 6, 2013.
Mesta Electronics, Inc., DPM Digital Power Manager Active Harmonic Filter, www.mesta.com website, Dec. 1, 2009, 4 pages.

* cited by examiner

*Primary Examiner* — Gary L Laxton
*Assistant Examiner* — Kyle J Moody
(74) *Attorney, Agent, or Firm* — James McGinness; Armstrong Teasdale LLP (57) ABSTRACT

A power conversion system for providing power to an electrical grid is described. The power conversion system includes a power converter coupled to a power source and the electrical grid. The power conversion system also includes a converter controller coupled to the power converter and configured to control operation of the power converter to actively cancel harmonic current received at the power converter from the electrical grid.

15 Claims, 5 Drawing Sheets

METHODS AND SYSTEMS FOR OPERATING A POWER CONVERTER

BACKGROUND OF THE INVENTION

The embodiments described herein relate generally to solar power generation, and more specifically, to methods and systems for reducing harmonic current transmitted from an electrical grid to a power generation system.

Solar energy has increasingly become an attractive source of energy and has been recognized as a clean, renewable alternative form of energy. Solar energy in the form of sunlight may be converted to electrical energy by solar cells. A more general term for devices that convert light to electrical energy is photovoltaic (PV) cells.

In order to obtain a higher current and voltage, PV cells are electrically connected to form a PV module. In addition to a plurality of PV cells, the PV module may also include sensors, for example, an irradiance sensor, a temperature sensor, a voltage meter, a current meter, and/or a power meter. PV modules may also be connected to form a module string. Typically, the DC voltages output by the module strings are provided to a power converter, for example, a DC to AC voltage inverter. The DC to AC voltage inverter converts the DC voltage to three-phase alternating current (AC) voltage or current. The three-phase AC output from the DC to AC inverter is provided to a power transformer, which steps up the voltage to produce a three-phase high-voltage AC that is applied to an electrical grid.

Ideally, an AC output voltage of the DC to AC inverter will match the AC voltage on the electrical grid. For example, the AC output voltage of the DC to AC inverter varies sinusoidally at a predefined frequency. When a linear load is coupled to the DC to AC inverter, it draws a sinusoidal current at the same frequency as the voltage. However, when a non-linear load is connected to the DC to AC inverter, it may draw a current that is not sinusoidal. The difference between the voltage and current waveforms may create a harmonic current that is transmitted from the electrical grid to the output of the DC to AC inverter.

Power systems and electrical grids typically include high power electronic loads that may create these harmonic currents. Harmonic currents increase heat in motors, circuit breakers, and transformers, and may cause unwanted equipment trips, circuit breaker trips, and a reduced power factor. As a result, harmonic currents may cause financial losses from added maintenance costs and production down-time. Solutions that passively reduce harmonic currents, for example, a large filter capacitor bank, may also cause undesirable grid resonance. To dampen the resonance created by adding filter capacitors, resistors may be added in series with the filter capacitors. However, an unwanted result of adding resistors is power dissipation by the resistors.

BRIEF DESCRIPTION OF THE INVENTION

In one aspect, a power conversion system for providing power to an electrical grid is provided. The power conversion system includes a power converter coupled to a power source and the electrical grid. The power conversion system also includes a converter controller coupled to the power converter and configured to control operation of the power converter to actively cancel harmonic current received at the power converter from the electrical grid.

In another aspect, a power converter controller for controlling a power converter is provided. The power converter controller includes an input configured to receive a grid current feedback signal, the grid current feedback signal comprising a grid current measurement including a plurality of harmonic current components. The power converter controller also includes a control system that includes a current regulator control loop configured to generate at least one voltage reference command, and a harmonic current reduction control loop configured to receive the grid current feedback signal and to generate at least one harmonic voltage cancellation command. The control system is configured to combine the at least one voltage reference command and the at least one harmonic cancellation voltage command to generate at least one adjusted voltage reference command that when provided to the power converter, creates a cancellation current that cancels at least one of the plurality of harmonic current components of the grid current. The power converter controller also includes an output configured to provide the at least one adjusted voltage reference command to the power converter.

In yet another aspect, a method for reducing harmonic current transmitted from an electrical grid to a power generation system is provided. The power generation system includes a power converter controller configured to control operation of a power converter. The method includes generating, using the power converter controller, at least one voltage reference command and receiving, at the power converter controller, a grid current feedback signal. The method also includes extracting at least one harmonic current component from the grid current feedback signal, the at least one harmonic current component corresponding to a selected harmonic. The method also includes generating at least one harmonic cancellation voltage command based at least partially on the at least one harmonic current component.

DETAILED DESCRIPTION OF THE INVENTION

The methods and systems described herein facilitate reducing at least one of a harmonic current and a harmonic voltage transmitted from an electrical grid to a power generation system. More specifically, the methods and systems described herein monitor the harmonic current and control a power converter included within the power generation system to output a harmonic cancellation current that is equal and opposite the harmonic current transmitted from the electrical grid. By canceling the harmonic current and/or the harmonic voltage, the fundamental frequency current is the only current component that is reflected back to the power generation system from the electrical grid.

Technical effects of the methods and systems described herein include at least one of: (a) generating, using a power converter controller, at least one voltage reference command; (b) receiving, at the power converter controller, a grid current feedback signal; (c) extracting at least one harmonic current component from the grid current feedback signal, the at least one harmonic current component corresponding to a selected harmonic; and, (d) generating at least one harmonic cancellation voltage command based at least partially on the at least one harmonic current component.

Figure 1:
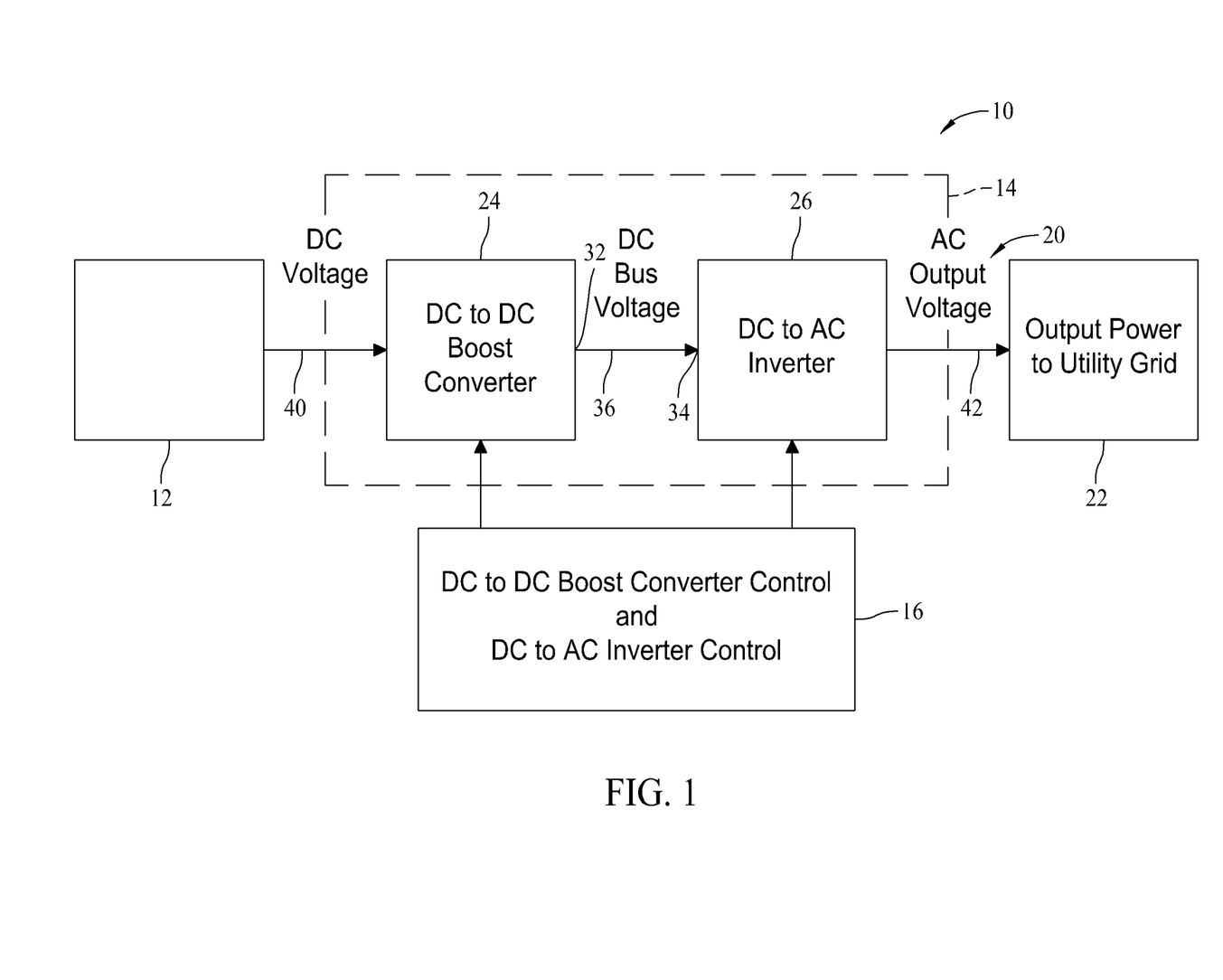
FIG. 1 is a block diagram of an exemplary embodiment of a power conversion system.

FIG. 1 is a block diagram of an exemplary embodiment of a power conversion system 10. In the exemplary embodiment, power conversion system 10 includes a power converter 14 and a system controller 16. Power conversion system 10 is configured to receive power from a direct current (DC) power source 12. Although illustrated as a two-stage power converter, power converter 14 may be a single-stage power converter, for example, a DC to alternating current (AC) power inverter. System 10 is configured to provide an AC output voltage 20 for delivery to a load, for example, but not limited to, a transformer or an electrical grid 22. Electrical grid 22 may include an electrical distribution grid, an electrical transmission grid, or any type of electrical grid configured for delivering electricity. DC power source 12 may include, but is not limited to, a photovoltaic (PV) array that includes at least one PV cell (not shown in FIG. 1), for example, at least one solar cell. Typically, a plurality of solar cells are coupled to form a solar array, also referred to as a solar module, and multiple solar modules are coupled to form a module string. The solar cells are arranged in this manner to increase the voltage and current output by the solar array. DC power source 12 may also include an energy storage device, for example, a battery or fuel cell, and/or any other source of DC power that allows power conversion system 10 to function as described herein.

It should be noted that the embodiments described herein are not limited to any particular system controller and/or processor for performing the processing tasks described herein. The term "processor," as that term is used herein, is intended to denote any machine capable of performing the calculations or computations necessary to perform the tasks described herein. The term "processor" also is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of embodiments of the invention, as will be understood by those skilled in the art. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

In the exemplary embodiment, power converter 14 includes a DC to DC boost converter 24 and a DC to AC inverter 26. System controller 16 is configured to independently control operation of boost converter 24 and inverter 26.

An output 32 of boost converter 24 is coupled to an input 34 of inverter 26 by at least one conductor, for example, a DC bus 36. Power source 12 is coupled to two-stage power converter 14 through at least one conductor 40, and inverter 26 is coupled to electrical grid 22 through at least one conductor 42. Alternatively, power source 12 may be directly coupled to inverter 26. Although illustrated as single lines, conductor 40, conductor 42, and DC bus 36 may include any number of separate conductors that allows system 10 to function as described herein. For example, if system 10 is a single-phase system, conductor 40, conductor 42, and DC bus 36 may each include a single conductor. Alternatively, if system 10 is a three-phase system, conductor 40, conductor 42, and DC bus 36 may each include three separate conductors, one for each phase. Furthermore, system 10 may include any suitable number of phases. A DC bus voltage is controlled by inverter 26. More specifically, system controller 16 controls operation of inverter 26 to control the DC bus voltage. Furthermore, inverter 26 may be configured to control a power factor of AC voltage 20 output by inverter 26 and provided to electrical grid 22.

Figure 2:
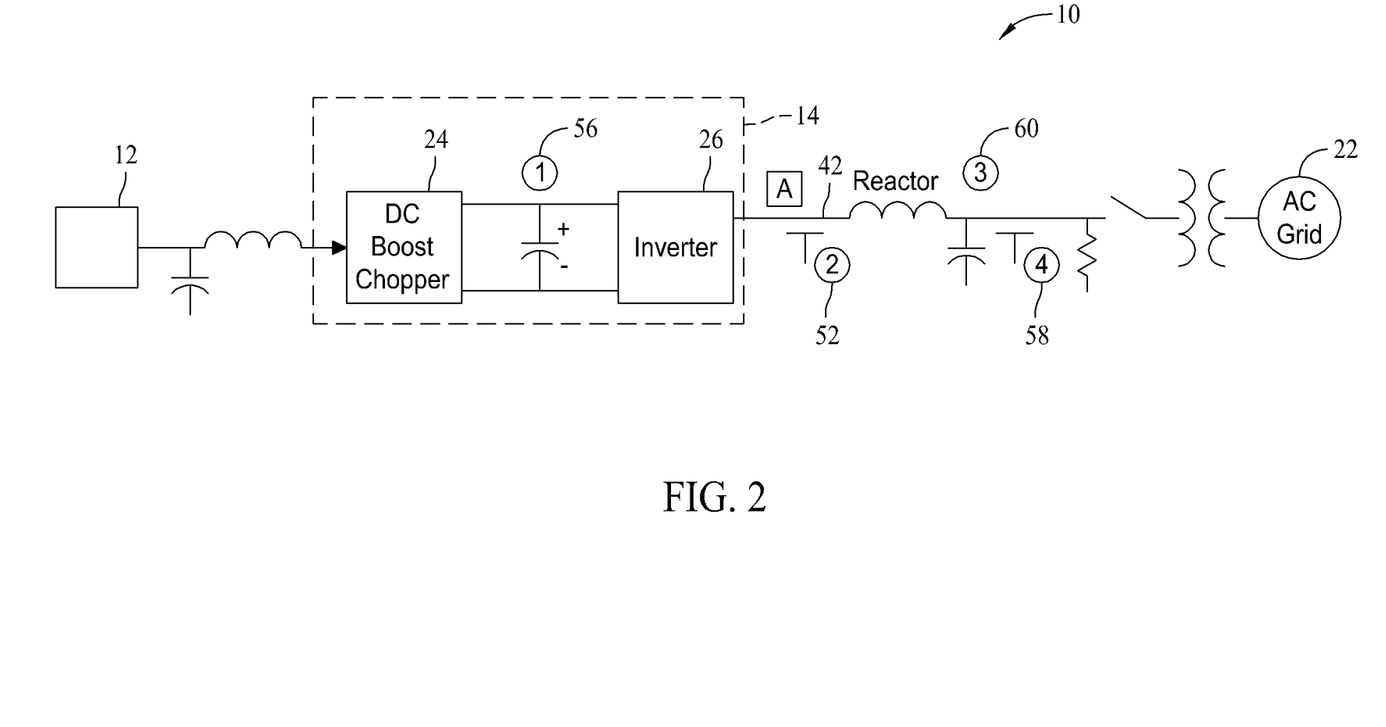
FIG. 2 is a circuit diagram of the power conversion system shown in FIG. 1.

FIG. 2 is a circuit diagram of system 10 (shown in FIG. 1). Components shared between FIGS. 1 and 2 are identified with identical reference numerals. In the exemplary embodiment, system 10 includes at least one current measurement device 52 configured to measure a current flowing through conductor 42 (i.e., current output by power converter 14). Current measurement device 52 provides system controller 16 (shown in FIG. 1) with a converter output current feedback signal corresponding to the measured output current. System 10 also includes a DC bus voltage measurement device 56. DC bus voltage measurement device 56 provides system controller 16 with a DC bus voltage feedback signal corresponding to the measured DC bus voltage.

In the exemplary embodiment, system 10 also includes at least one grid current measurement device 58 configured to measure a grid current. Grid current measurement device 58 provides system controller 16 with a grid current feedback signal corresponding to the measured grid current. Furthermore, in the exemplary embodiment, system 10 includes a grid voltage measurement device 60 configured to measure a grid voltage. Grid voltage measurement device 60 provides system controller 16 with a grid voltage feedback signal corresponding to the measured grid voltage.

Figure 3:
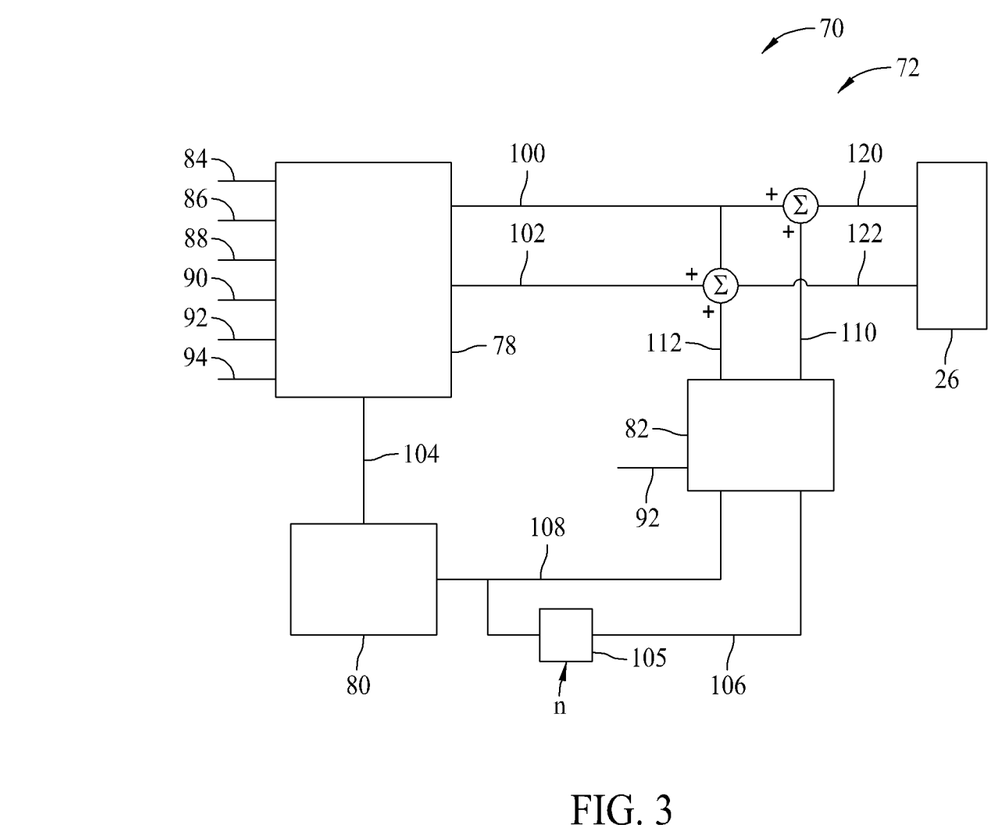
FIG. 3 is a block diagram of a control system that may be included within the power conversion system shown in FIG. 1.

FIG. 3 is a block diagram 70 of a control system 72 that may be included within system 10 (shown in FIG. 1). In the exemplary embodiment, control system 72 is included within converter controller 16 (shown in FIG. 1). More specifically, in the exemplary embodiment, control system 72 provides inverter 26 (shown in FIG. 1) with harmonic voltage cancellation commands, that when executed by inverter 26, reduce the harmonic currents flowing between electrical grid 22 (shown in FIG. 1) and inverter 26.

In the exemplary embodiment, control system 72 includes a grid-side current regulator control loop 78, a phase locked loop 80, and a harmonic current reduction control loop 82. Current regulator control loop 78 receives a DC bus voltage feedback signal 84 from, for example, DC voltage measurement device 56 (shown in FIG. 2). Current regulator control loop 78 also receives a DC voltage reference signal 86, which may be retrieved from a memory and/or provided by a user. Current regulator control loop 78 also receives an inverter output current feedback signal 88 from, for example, converter output current measurement device 52 (shown in FIG. 2). Current regulator control loop 78 also receives a grid voltage feedback signal 90 from, for example, grid voltage measurement device 60 (shown in FIG. 2). Current regulator control loop 78 also receives a grid current feedback signal 92 from, for example, grid current measurement device 58 (shown in FIG. 2). Furthermore, current regulator control loop 78 may also receive a voltage-ampere reactive (VAR) command signal 94, which may be retrieved from a memory and/or provided by a user.

In the exemplary embodiment, control system 72 generates a real voltage reference command 100 and a reactive voltage reference command 102, which are based at least partially on signals 84, 86, 88, 90, 92, and 94.

In the exemplary embodiment, current regulator control loop 78 demodulates grid voltage feedback signal 90 into a real voltage feedback component 103 (shown in FIG. 4) and a reactive voltage feedback component 104. Reactive voltage feedback component 104 is provided to phase locked loop 80.

Phase locked loop 80 tracks the phase angle of reactive voltage feedback component 104. Phase locked loop 80 is also provided with a harmonic selection signal 105 corresponding to a specific harmonic of a plurality of harmonics included within grid current feedback signal 92. For example, a user may select the harmonic current to be canceled using control system 72. In a specific non-limiting example, the user may select to remove harmonic current associated with the $10^{th}$ harmonic. In the exemplary embodiment, phase locked loop 80 outputs a phase angle 106 associated with the harmonic frequency and a phase angle 108 associated with the fundamental frequency.

In the exemplary embodiment, harmonic current reduction control loop 82 receives grid current feedback signal 92, phase angle 106, and phase angle 108, and generates a real harmonic cancellation voltage command 110 and a reactive harmonic cancellation voltage command 112. Based on grid current feedback signal 92 and phase angle 106, real harmonic cancellation voltage command 110 and reactive harmonic cancellation voltage command 112 add a harmonic cancellation current associated with the selected harmonic that is equal and opposite the harmonic current received from electrical grid 22. More specifically, control system 72 combines real voltage reference command 100 and real harmonic cancellation voltage command 110 to generate an adjusted real voltage reference command 120. Control system 72 also combines reactive voltage reference command 102 and reactive harmonic cancellation voltage command 112 to generate an adjusted reactive voltage reference command 122. Adjusted real voltage reference command 120 and adjusted reactive voltage reference command 122 are provided to inverter 26 to regulate an output of inverter 26. In other words, control system 72 causes inverter 26 to operate as an active harmonic cancellation filter. Harmonic current reduction control loop 82 may also facilitate canceling harmonic current at multiple selected harmonics. By canceling the harmonic current components, the true fundamental frequency current is the only current component that is reflected back to power converter 14.

Figure 4:
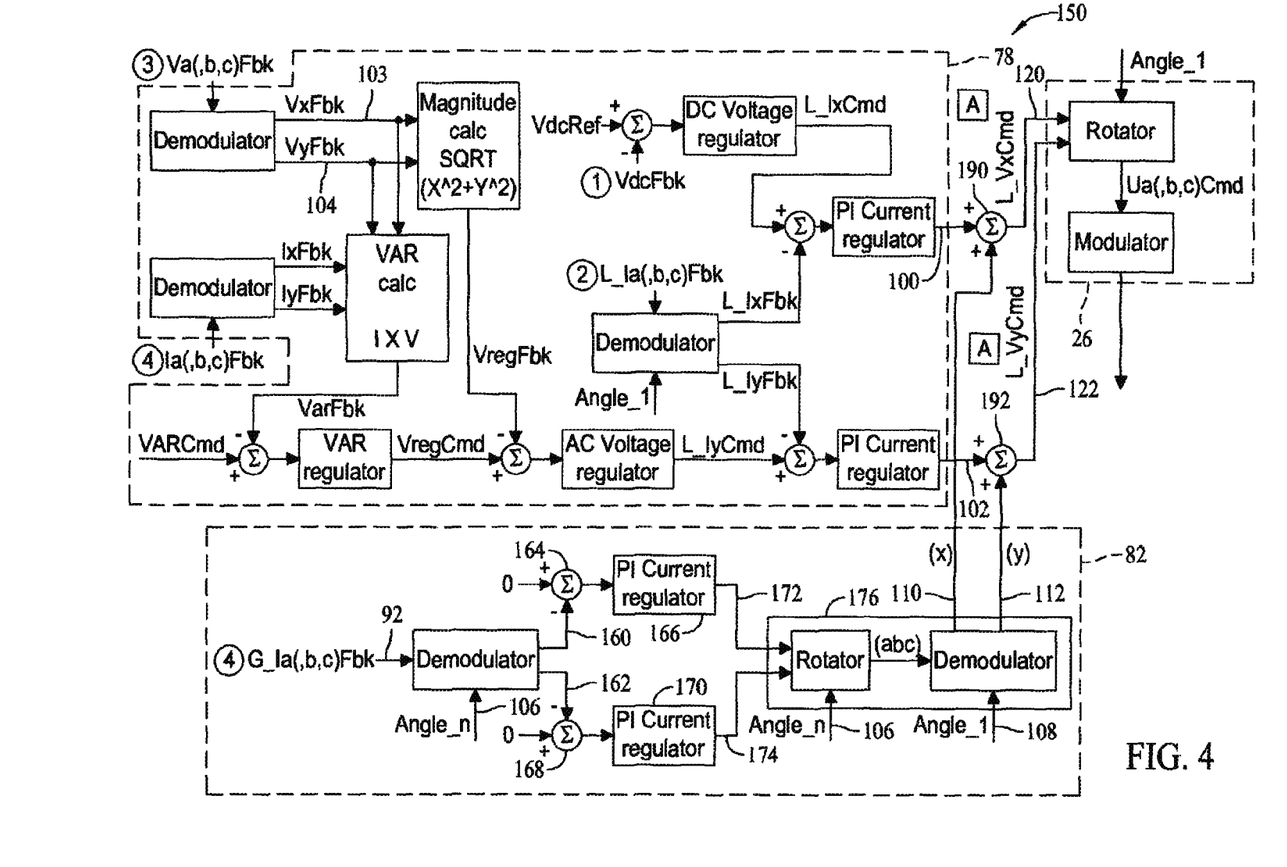
FIG. 4 is an exemplary control diagram of converter controller operation.

FIG. 4 is an exemplary control diagram 150 executed by control system 72 (shown in FIG. 3). For example, control system 72 may be configured to operate in accordance with control diagram 150. In the exemplary embodiment, harmonic current reduction control loop 82 receives grid current feedback signal 92 from grid current measurement device 58 (shown in FIG. 2).

In the exemplary embodiment, grid current feedback signal 92 is demodulated into a real grid current feedback signal 160 and a reactive grid current feedback signal 162. More specifically, a specific frequency of grid current feedback signal 92 is demodulated into real grid current feedback signal 160 and reactive grid current feedback signal 162. The specific frequency corresponds to phase angle 106 provided to harmonic current reduction control loop 82 by phase locked loop 80 (shown in FIG. 3). As described above, phase angle 106 is associated with a selected harmonic.

In the exemplary embodiment, real grid current feedback signal 160 is provided to a signal sign inverter 164 that changes a sign of the magnitude of real grid current feedback signal 160 and provides the opposite polarity of real grid current feedback signal 160 to a current regulator 166. For example, if real grid current feedback signal 160 is a sine wave having an amplitude of 1 Ampere and a phase angle of 0°, signal sign inverter 164 will output a sine wave having an amplitude of 1 Ampere and a phase angle of 180° (i.e., −1 Ampere). Reactive grid current feedback signal 162 is provided to a signal sign inverter 168 that changes a sign of the magnitude of reactive grid current feedback signal 162 and provides the opposite polarity of reactive grid current feedback signal 162 to a current regulator 170. Current regulator 166 generates a real voltage cancellation reference command 172 and current regulator 170 generates a reactive voltage cancellation reference command 174. Real voltage cancellation reference command 172 and reactive voltage cancellation reference command 174 are provided to a rotator/demodulator 176 that generates real harmonic cancellation voltage command 110 and reactive harmonic cancellation voltage command 112. Although described above as generated by rotator/demodulator 176, real and reactive harmonic cancellation voltage commands 110 and 112 may be generated using other trigonometric functions, including, but not limited to, a sine and/or cosine of phase angles 106 and/or 108. For example, it may be more efficient for a processor to rotate by N*Angle and counter-rotate by 1*Angle than to calculate the sine and/or cosine of (N−1)*Angle.

As described above, current regulator control loop 78 generates real voltage reference command 100 and reactive voltage reference command 102. Real voltage reference command 100 is combined with real harmonic cancellation voltage command 110 at a summing point 190. An output of summing point 190 is adjusted real voltage reference command 120. Reactive voltage reference command 102 is combined with reactive harmonic cancellation voltage command 112 at a summing point 192. An output of summing point 192 is adjusted reactive voltage reference command 122. Real voltage reference command 120 and reactive voltage reference command 122 are provided to DC to AC inverter 26 and inverter 26 operates in accordance with commands 120 and 122.

Figure 5:
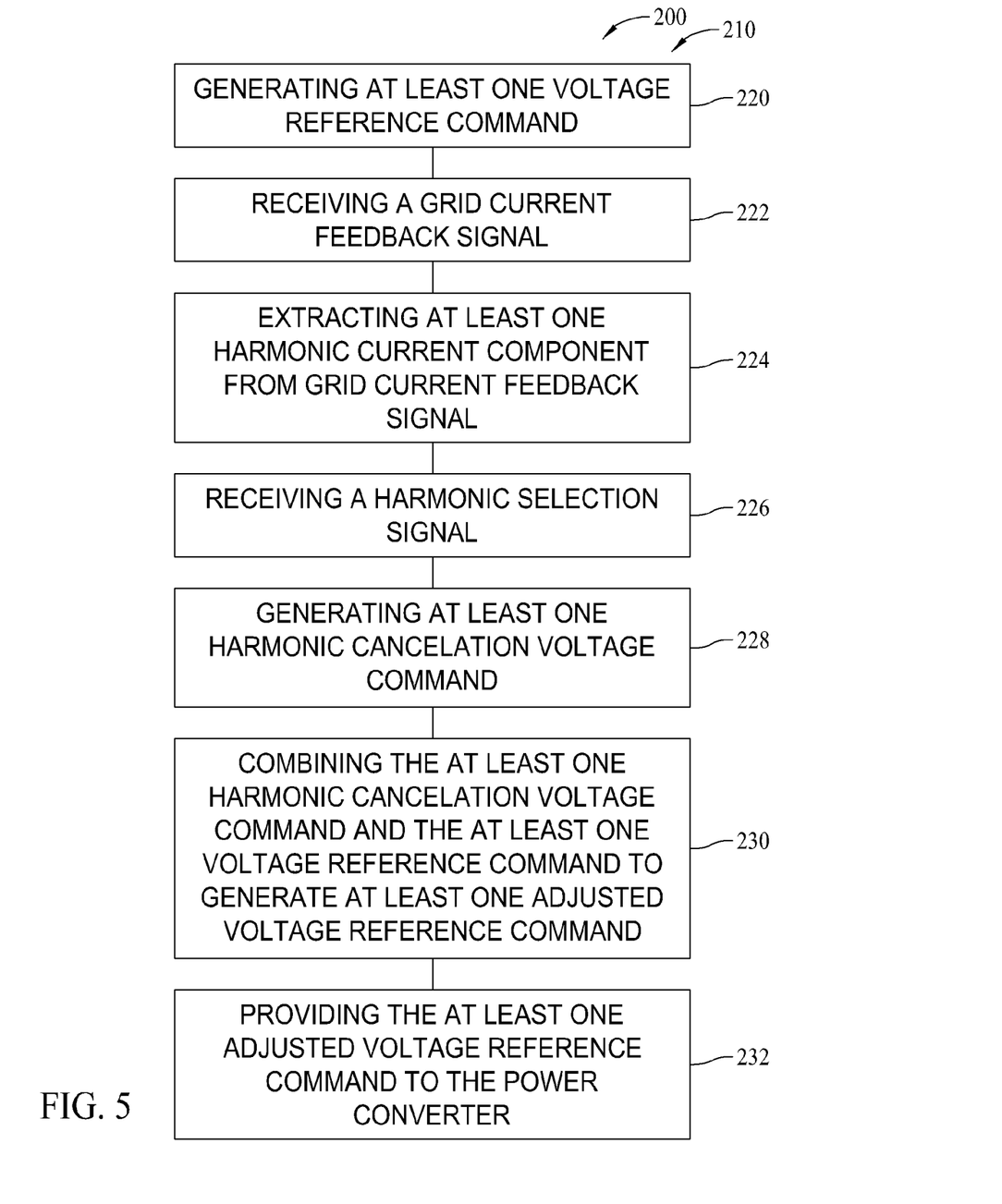
FIG. 5 is a flow chart of an exemplary method for reducing harmonic current transmitted from the electrical grid to the power converter shown in FIG. 1.

FIG. 5 is a flow chart 200 of an exemplary method 210 for reducing harmonic current transmitted from an electrical grid, for example, electrical grid 22 (shown in FIG. 1), to a power conversion system, for example, power conversion system 10 (shown in FIG. 1). As described above, power conversion system 10 includes power converter controller 16 (shown in FIG. 1) configured to control operation of power converter 14 (shown in FIG. 1). In the exemplary embodiment, method 210 includes generating 220 at least one voltage reference command. Power converter controller 16 may generate 220 a real voltage reference command, for example, real voltage reference command 100 (shown in FIG. 3), and a reactive voltage reference command, for example, reactive voltage reference command 102 (shown in FIG. 3).

In the exemplary embodiment, method 210 also includes receiving 222 a grid current feedback signal. Converter controller 16 may receive 222 a grid current feedback signal, for example, grid current feedback signal 92 (shown in FIG. 3). Method 210 also includes extracting 224 at least one harmonic current component from grid current feedback signal 92. Method 210 may also include receiving 226 a harmonic selection signal, for example, harmonic selection signal 105 (shown in FIG. 3), that identifies a selected harmonic. Converter controller 16 extracts 224 at least one harmonic current component associated with the phase angle of the selected harmonic. Method 210 also includes generating 228 at least one harmonic cancellation voltage command based at least partially on the at least one harmonic current component. For example, converter controller 16 may generate real harmonic cancellation voltage command 110 and reactive harmonic cancellation voltage command 112.

In the exemplary embodiment, method 210 also includes combining 230 the at least one harmonic cancellation voltage command and the at least one voltage reference command to generate at least one adjusted voltage reference command.

For example, the at least one adjusted voltage reference command may include adjusted real voltage reference command 120 (shown in FIG. 3) and adjusted reactive voltage reference command 122 (shown in FIG. 3). Method 210 also includes providing 232 the at least one adjusted voltage reference command to power converter 14.

More specifically, generating 228 at least one harmonic cancellation voltage command includes receiving the grid current feedback signal and the harmonic selection signal, for example, at converter controller 16. Converter controller 16 demodulates grid current feedback signal 92 to generate a real grid current feedback signal, for example, real grid current feedback signal 160 (shown in FIG. 4), and a reactive grid current feedback signal, for example, reactive grid current feedback signal 162, at a phase angle associated with the selected harmonic. Converter controller 16 changes the signs of the magnitudes of real grid current feedback signal 160 and reactive grid current feedback signal 162 to generate a real grid current cancellation signal and a reactive grid current cancellation signal. Converter controller 16 generates, for example, using current regulator 166 (shown in FIG. 4), real voltage cancellation reference command 172 from the real grid current cancellation signal and reactive voltage cancellation reference command 174 from the reactive grid current cancellation signal. Furthermore, in the exemplary embodiment, a rotator and a demodulator, for example, rotator/demodulator 176 (shown in FIG. 3) generates the at least one harmonic cancellation voltage command based on real voltage cancellation reference command 172 and reactive voltage cancellation reference command 174.

Furthermore, one or more computer-readable media having computer-executable components, may be configured for controlling operation of a power converter. The computer-executable components may include: an interface component that, when executed by at least one processor, causes the at least one processor to receive a grid current feedback signal and a selected harmonic phase angle signal; a memory component that, when executed by at least one processor, causes the at least one processor to store at least one algorithm for determining reactive harmonic cancellation voltage commands; and an analysis component that, when executed by at least one processor, causes the at least one processor to generate operating signals that control operation of the power converter.

The embodiments described herein embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The above-described embodiments facilitate efficient and cost-effective operation of a power generation system. The control system described herein controls operation of the power converter to actively cancel harmonic current received at a power converter from the electrical grid.

Exemplary embodiments of a power generation system that includes a power converter are described above in detail. The methods and systems are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conversion system for providing power to an electrical grid comprising:
   a power converter coupled to a power source and the electrical grid;
   at least one grid measurement device coupled to the power source and configured to measure a grid current and to generate a grid current feedback signal corresponding to the measured grid current; and
   a converter controller coupled to said power converter and said at least one grid measurement device and comprising:
   a control loop configured to generate a real voltage reference command and to receive a grid voltage feedback signal and demodulate the grid voltage feedback signal into a real voltage feedback component and a reactive voltage feedback component; and, a harmonic current reduction control loop coupled to said control loop and configured to generate a real harmonic cancellation voltage command and a reactive harmonic cancellation voltage command, said converter controller configured to combine the real voltage reference command and the real harmonic cancellation voltage command to generate an adjusted real voltage reference command; and said harmonic current reduction control loop configured to:
receive the grid current feedback signal and a harmonic selection signal corresponding to a selected harmonic;
extract a harmonic current component from the grid current feedback signal;
demodulate the grid current feedback signal to generate a real grid current feedback signal and a reactive grid current feedback signal at a frequency associated with the selected harmonic;
change a sign of a magnitude of the real grid current feedback signal to generate a real grid current cancellation signal;
change a sign of a magnitude of the reactive grid current feedback signal to generate a reactive grid current cancellation signal;
generate, using at least one current regulator, a real voltage cancellation reference command from the real grid current cancellation signal and a reactive voltage cancellation reference command from the reactive grid current cancellation signal; and
generate, using a rotator and a demodulator, at least one harmonic cancellation voltage command based at least partially on the harmonic current component of the grid current feedback signal
to control operation of said power converter to actively cancel harmonic current received at said power converter from the electrical grid.

2. The power conversion system in accordance with claim 1, wherein said converter controller is configured to provide at least one adjusted voltage reference command to said power converter that when executed actively cancels harmonic current received at said power converter from the electrical grid.

3. The power conversion system in accordance with claim 1, wherein the at least one harmonic cancellation voltage command comprises at least one of the real harmonic cancellation voltage command and the reactive harmonic cancellation voltage command.

4. The power conversion system in accordance with claim 1, wherein said converter controller includes a current regulator control loop configured to generate at least one voltage reference command.

5. The power conversion system in accordance with claim 4, wherein said converter controller is configured to:
combine the at least one harmonic cancellation voltage command and the at least one voltage reference command to generate the at least one adjusted voltage reference command; and,
provide the at least one adjusted voltage reference command to said power converter.

6. A power converter controller for controlling a power converter, said power converter controller comprising:
an input configured to receive a grid current feedback signal, the grid current feedback signal comprising a grid current measurement including a plurality of harmonic current components;

a control system comprising:
a current regulator control loop configured to generate at least one voltage reference command, and
a harmonic current reduction control loop configured to:
receive the grid current feedback signal and a selected harmonic;
demodulate the grid current feedback signal to generate a real grid current feedback signal and a reactive grid current feedback signal at a frequency associated with the selected harmonic;
change a sign of a magnitude of the real grid current feedback signal to generate a real grid current cancellation signal;
change a sign of a magnitude of the reactive grid current feedback signal to generate a reactive grid current cancellation signal;
generate, using a current regulator, a real voltage cancellation reference command from the real grid current cancellation signal and a reactive voltage cancellation reference command from the reactive grid current cancellation signal; and
generate, using a rotator and a demodulator, at least one harmonic cancellation voltage command.

7. The power converter controller in accordance with claim 6, wherein the at least one voltage reference command comprises at least one of a real voltage reference command and a reactive voltage reference command.

8. The power converter controller in accordance with claim 6, wherein the at least one harmonic cancellation voltage command comprises at least one of a real harmonic cancellation voltage command and a reactive harmonic cancellation voltage command.

9. The power converter controller in accordance with claim 6, wherein the
control system is configured to combine the at least one voltage reference command and the at least one harmonic cancellation voltage command to generate at least one adjusted voltage reference command that when provided to the power converter creates a cancellation current that cancels at least one of the plurality of harmonic current components of the grid current; and
an output configured to provide the at least one adjusted voltage reference command to the power converter.

10. The power converter controller in accordance with claim 9, wherein said input is further configured to receive a harmonic selection signal corresponding to the selected harmonic of the plurality of current harmonic components.

11. A method for reducing harmonic current transmitted from an electrical grid to a power conversion system that includes a power converter controller configured to control operation of a power converter, said method comprising:
receiving, at the power converter controller, a grid current feedback signal;
extracting at least one harmonic current component from the grid current feedback signal, the at least one harmonic current component corresponding to a selected harmonic;
demodulating the grid current feedback signal to generate a real grid current feedback signal and a reactive grid current feedback signal at a phase angle associated with the selected harmonic;
changing a sign of a magnitude of the real grid current feedback signal to generate a real grid current cancellation signal;
changing a sign of a magnitude of the reactive grid current feedback signal to generate a reactive grid current cancellation signal;

generating, using a current regulator, a real voltage cancellation reference command from the real grid current cancellation signal and a reactive voltage cancellation reference command from the reactive grid current cancellation signal; and generating, using a rotator and a demodulator, at least one harmonic cancellation voltage command.

12. The method in accordance with claim 11, further comprising receiving a harmonic selection signal identifying the selected harmonic.

13. The method in accordance with claim 11, further comprising determining the phase angle of the selected harmonic using a phase locked loop.

14. The method in accordance with claim 11, further comprising:

generating, using the power converter controller, at least one voltage reference command; and, combining the at least one harmonic cancellation voltage command and the at least one voltage reference command to generate at least one adjusted voltage reference command.

15. The method in accordance with claim 14, further comprising providing the at least one adjusted voltage reference command to the power converter, wherein the power converter is operated in accordance with the at least one adjusted voltage reference command to create a cancellation current that cancels at least one of a plurality of harmonic current components of the electrical grid current.

* * * * *